US005214451A

United States Patent [19]

Schmidlin et al.

[11] Patent Number: 5,214,451

[45] Date of Patent: May 25, 1993

[54] TONER SUPPLY LEVELING IN MULTIPLEXED DEP

[75] Inventors: Fred Schmidlin, Pittsford; John D. Sotack; William M. Lindenfelser, both of Rochester, all of N.Y.

[73] Assignee: Xerox Corporation, Stamford, Conn.

[21] Appl. No.: 812,144

[22] Filed: Dec. 23, 1991

[51] Int. Cl.[5] .............. G01D 15/06

[52] U.S. Cl. .............. 346/159; 346/154; 346/153.1; 346/1.1

[58] Field of Search .............. 346/159, 1.1, 153.1, 346/154, 155

[56] References Cited

U.S. PATENT DOCUMENTS

| | | | |
|---|---|---|---|
| 3,689,935 | 9/1972 | Pressman et al. | 346/74 ES |
| 4,491,855 | 1/1985 | Fujii et al. | 346/159 |
| 4,498,090 | 2/1985 | Honda et al. | 346/159 |
| 4,568,955 | 2/1986 | Hosoya et al. | 346/153.1 |
| 4,912,489 | 3/1990 | Schmidlin | 346/159 |
| 5,040,004 | 8/1991 | Schmidlin et al. | 346/159 |

*Primary Examiner*—Benjamin R. Fuller
*Assistant Examiner*—R. Gibson

[57] ABSTRACT

Direct electrostatic printing apparatus including a cylindrically shaped donor structure for delivering imaging material such as toner particles to a printhead forming an integral part of the printing device. The printhead structure includes control electrodes and a shield electrode structure secured to opposite sides of an insulative base. The donor structure has a relatively small diameter compared to such devices of the prior art making it impossible to deliver adequate quantities of toner to some of the printhead apertures using electrical biasing techniques of the prior art. In the device disclosed, the printhead apertures are biased according to the aperture spacing from the donor structure. The magnitude of the bias or its duration applied to the apertures farther from the donor structure surface is such that toner delivery to those apertures is equal to that of all other apertures.

4 Claims, 2 Drawing Sheets

TONER SUPPLY LEVELING IN MULTIPLEXED DEP

BACKGROUND OF THE INVENTION

This invention relates to a direct electrostatic printing device and more particularly to an apertured printhead structure utilized for depositing developer or toner in image configuration on plain paper substrates.

Of the various electrostatic printing techniques, the most familiar is that of xerography wherein latent electrostatic images formed on a charge retentive surface are developed by a suitable toner material to render the images visible, the images being subsequently transferred to plain paper.

A less familiar form of electrostatic printing is one that has come to be known as direct electrostatic printing (DEP). This form of printing differs from the aforementioned xerographic form, in that, the toner or developing material is deposited directly onto a plain (i.e. not specially treated) substrate in image configuration. This type of printing device is disclosed in U.S. Pat. No. 3,689,935 issued Sep. 5, 1972 to Gerald L. Pressman et al.

Pressman et al disclose an electrostatic line printer incorporating a multilayered particle modulator or printhead comprising a layer of insulating material, a continuous layer of conducting material on one side of the insulating layer and a segmented layer of conducting material on the other side of the insulating layer. At least one row of apertures is formed through the multilayered particle modulator. Each segment of the segmented layer of the conductive material is formed around a portion of an aperture and is insulatively isolated from every other segment of the segmented conductive layer. Selected potentials are applied to each of the segments of the segmented conductive layer while a fixed potential is applied to the continuous conductive layer. An overall applied field projects charged particles through the row of apertures of the particle modulator and the density of the particle stream is modulated according to the pattern of potentials applied to the segments of the segmented conductive layer. The modulated stream of charged particles impinge upon a print-receiving medium interposed in the modulated particle stream and translated relative to the particle modulator to provide line-by-line scan printing. In the Pressman et al device the supply of the toner to the control member is not uniformly effected and irregularities are liable to occur in the image on the image receiving member. High-speed recording is difficult and moreover, the openings in the printhead are liable to be clogged by the toner.

U.S. Pat. No. 4,491,855 issued on Jan. 1, 1985 in the name of Fujii et al discloses a method and apparatus utilizing a controller having a plurality of openings or slit-like openings to control the passage of one-component insulative magnetic toner and to record a visible image by the charged particles directly on an image receiving member. Fuji, et al. show an apertured printhead structure having wedge-shaped apertures wherein the larger diameter of an aperture is delineated by a signal or control electrode and is disposed opposite an image receiving substrate.

U.S. Pat. No. 4,568,955 issued on Feb. 4, 1986 to Hosoya et al discloses a recording apparatus wherein a visible image based on image information is formed on an ordinary sheet by a developer. The recording apparatus comprises a developing roller spaced at a predetermined distance from and facing the ordinary sheet and carrying the developer thereon. It further comprises a recording electrode and a signal source connected thereto for propelling the developer on the developing roller to the ordinary sheet by generating an electric field between the ordinary sheet and the developing roller according to the image information. A plurality of mutually insulated electrodes are provided on the developing roller and extend therefrom in one direction. An A.C. and a D.C. source are connected to the electrodes, for generating an alternating electric field between adjacent ones of the electrodes to cause oscillations of the developer found between the adjacent electrodes along electric lines of force therebetween to thereby liberate the developer from the developing roller. In a modified form of the Hosoya et al device, a toner reservoir is disposed beneath a recording electrode which has a top provided with an opening facing the recording electrode and an inclined bottom for holding a quantity of toner. In the toner reservoir are disposed a toner carrying plate as the developer carrying member, secured in a position such that it faces the end of the recording electrode at a predetermined distance therefrom and a toner agitator for agitating the toner.

U.S. Pat. No. 4,912,489 granted to Fred W. Schmidlin on Mar. 27, 1990 and assigned to the same assignee as the instant invention relates to direct electrostatic printing wherein the printhead structure thereof is constructed such that the control electrodes thereof are disposed opposite the toner supply resulting in reduced control voltage requirements.

Typically, a donor roll structure is utilized for supplying toner particles to the apertures of printhead structures of the type disclosed in the above-discussed patents. A problem with delivering toner using a donor roll structure is that in order to provide an equal amount of toner to all printhead apertures the donor roll must have a relatively large diameter. When the donor roll structure has a sufficiently large diameter all apertures of the printhead structure are substantially the same distance from the roll surface and variations in print density due to the sensitivity to source gap are essentially eliminated. Such a limitation on roll diameter doesn't lend itself to the fabrication of small, compact printers. As will be appreciated, it would be highly desirable to be able to manufacture DEP printers with relatively small ($\frac{3}{4}$ to $1\frac{1}{4}$ inch) diameter rolls.

BRIEF DESCRIPTION OF THE INVENTION

The present invention provides a developer or toner delivery roller disposed to one side of a printhead and an electrically biased shoe or electrode which is disposed to the opposite side of the printhead from the toner delivery system.

The printhead structure comprises a sandwhich-like structure including an insulative base member having control electrodes carried by one side thereof and shield electrodes carried by the other side. Apertures extending through the printhead structure are delimited by circular openings in the control electrodes and corresponding circular openings in the shield electrodes and base member. The shield electrodes are arranged in four horizontally oriented rows while the control electrodes are arranged in substantially vertically oriented columns. For a 300 spots per inch (SPI) printer with four row electrodes there would be 75 column electrodes per inch. The regions above and below the shield electrodes on the supply side are fully metalized and kept at ground potential. The grounded region on the up stram side of the print head supports an oscillating AC field and allows the toner to begin jumping prior to reaching the printing apertures. These metalized regions or electrodes are important because toner jumping prior to the toner reaching the first row of apertures is enabled.

Electrical biasing of the shield electrodes is provided in a manner such that an equal quantity of toner is supplied to each aperture regardless of its distance from the surface of the donor roller. To this end, biases are applied to the shield electrodes according to their distance from the surface of the donor roller. Thus, if the shield electrode and corresponding apertures are farther away from the donor roll surface than another shield electrode then the bias applied to that electrode is either of a different magnitude or it is applied for a longer duration. Factors other than gap influence toner flow.

In a non-multiplexed system with the printhead perfectly centered, the first row can have a lower toner flow because the jumping action has not had time to saturate until after the toner has passed the first row. However, very close tolerances must be met.

DETAILED DESCRIPTION OF THE DRAWINGS

DESCRIPTION OF THE PREFERRED EMBODIMENT OF THE INVENTION

Figure 1:
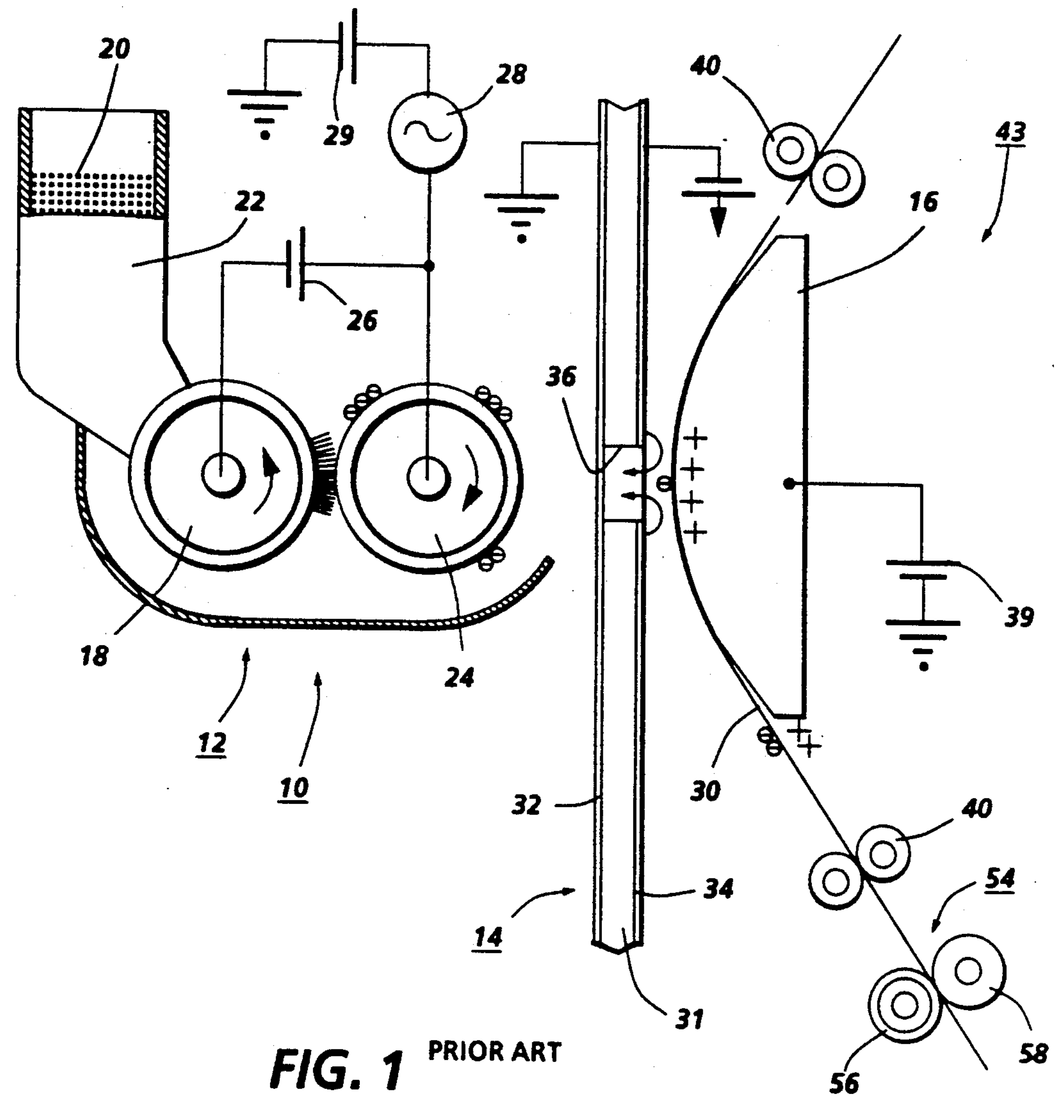
FIG. 1 PRIOR ART
FIG. 1 is a schematic illustration of a prior art printing apparatus depicting the basic elements of a DEP apparatus.

Disclosed in FIG. 1 is an embodiment of a direct electrostatic printing apparatus 10 known in the prior art.

The printing apparatus 10 includes a developer delivery system generally indicated by reference character 12, a printhead structure 14 and a backing electrode or shoe 16.

The developer delivery system 12 includes a conventional magnetic brush 18 supported for rotation adjacent a supply of toner 20 contained in a hopper 22. A developer donor roll 24 is supported for rotation intermediate the magnetic brush 18 and the printhead structure 14. The donor roll structure is coated with Teflon-S (Trademark of E.I. dupont) is spaced from the printhead approximately 0.003 to 0.015 inch. Teflon-S is a tetrafluoroethylene fluorocarbon polymer that is loaded with carbon black. The magnetic brush has a dc bias of about 200 volts relative to the donor applied thereto via a dc voltage source 26. An AC voltage of about 400 volts at 3 kHz provided by source 28 with a dc bias in the order of +20 to +50 volts provided by source 29 is applied to the donor roll 24. The applied voltages are effective to cause transfer of approximately a monolayer of toner from the brush 18 to the donor roll 24. The monolayer is subsequently jumped to the vicinity of the apertures of the printhead. The DC bias level determines the quantity of toner that is available for image deposition by the printhead structure 14.

The developer preferably comprises any suitable insulative nonmagnetic or magnetic toner/carrier combination having Aerosil (Trademark of Degussa, Inc.) contained therein in an amount equal to ½% by weight and also having zinc stearate contained therein in an amount equal to 1% by weight. As will be apparent to those skilled in the art, different developers with different amounts of additives require different operating conditions for optimal control of the toner flow.

The printhead structure 14 comprises a layered member including an electrically insulative base member 31 fabricated from a polyimide film approximately 0.001 inch thick. The base member is clad on the one side thereof with a continuous conductive layer or shield 32 of aluminum which is approximately one micron thick. The opposite side of the base member 30 carries segmented conductive layer 34 thereon which is fabricated from aluminum. A plurality of holes or apertures 36, (only one of which is shown) approximately 0.15 mm in diameter are provided in the layered structure in a pattern suitable for use in recording information. The apertures form an electrode array of individually addressable electrodes. With the shield grounded and zero to +50 volts applied to an addressable electrode, toner is propelled through the aperture associated with that electrode. The aperture extends through the base 31 and the conductive layers 32 and 34.

With a negative 300 volts applied to an addressable electrode toner is prevented from being propelled through the aperture. Image intensity can be varied by adjusting the voltage on the control electrodes between 0 and minus 300 volts. Addressing of the individual electrodes can be effected in any well known manner know in the art of printing using electronically addressable printing elements.

The electrode or shoe 16 has an arcuate shape as shown but as will be appreciated, the present invention is not limited by such a configuration. The shoe which is positioned on the opposite side of a plain paper recording medium 30 from the printhead deflects the recording medium in order to provide an extended area of contact between the medium and the shoe.

The recording medium 30 may comprise cut sheets of paper fed from a supply tray, not shown. The sheets of paper which are spaced from the printhead 14 a distance in the order of 0.003 to 0.030 inch as they pass therebetween. The sheets 30 are transported in contact with the shoe 16 via edge transport roll pairs 42.

During printing the shoe 16 is electrically biased to a positive dc potential of approximately 400 volts via a dc voltage source 38.

Figure 2:
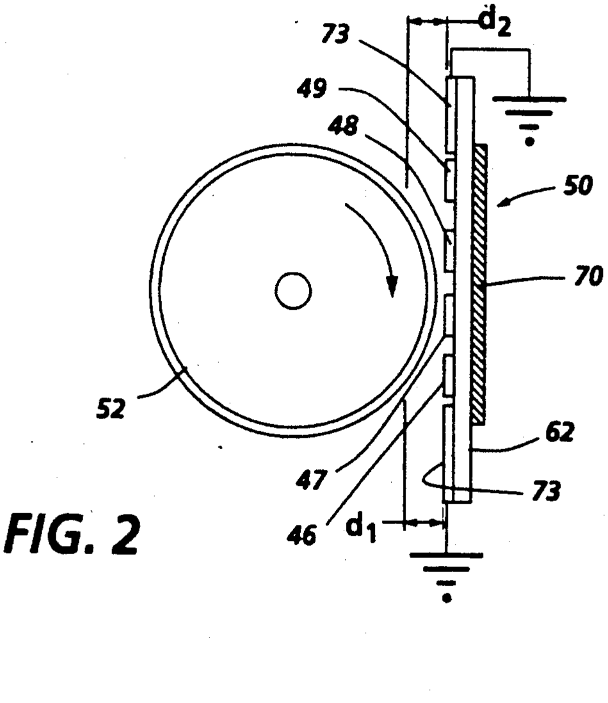
FIG. 2 is a schematic view of a toner delivery member in the form of a donor roll and a printhead structure illustrating a limitation of prior art DEP devices.

As shown in FIG. 2, the four rows of apertures and associated shield electrodes 46, 47, 48 and 49 of a DEP printhead structure 50 are not equally spaced from the surface of a donor roll structure 52. As can be seen, the top and bottom rows are farther away from the donor surface than the two middle rows. The donor roll structure 52 according to the present invention has a diameter in the order ½ to 1 inch. In prior art DEP configurations where the diameter of the donor roll is about 1½ inches, the differences in the spacing of the rows of apertures from the surface of the donor roll structure can be tolerated because the difference in the amount of toner delivered to the apertures farthest from the donor roll surface compared to those which are the closest is insignificant. However, when the donor roll structure is in the order of ½ to 1 inch, the quantity of toner delivered to the apertures in the top and bottom shield electrodes 46 and 49 which are spaced from the donor roll surface distances $d_1$ and $d_2$ is unacceptable for quality printing.

Figure 3:
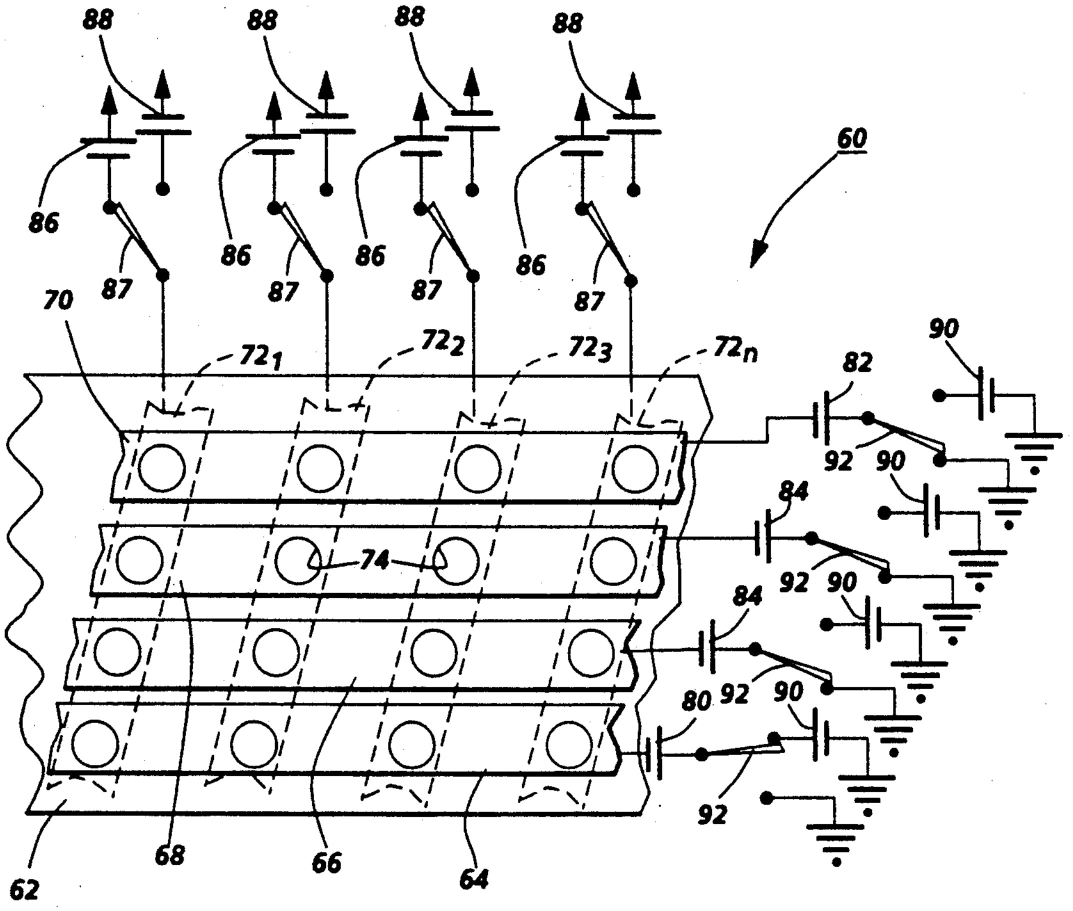
FIG. 3 is an enlarged fragmentary view of a modified printhead aperture according to the invention.

A modified printhead structure as illustrated in FIG. 3 comprises a layered structure 60 including an electrically insulative base member 62 fabricated from a polyimide film approximately 0.001 inch thick. The base member is clad on the one side thereof with four horizontally oriented shield electrodes 64, 66, 68 and 70. The opposite side of the base member 62 is provided with a plurality of control electrode structures $72_1$, $72_2$, $72_3$ through $72_n$. The regions indicated by reference character 73 above and below the shield electrodes on the supply side of the printhead structure are fully metalized and kept at ground potential. The grounded region on the up stream side of the print head supports the oscillating AC field and allows the toner to begin jumping prior to reaching the printing apertures. For a 300 spots per inch (SPI) printer there would be 75 column electrodes per inch. The control electrodes occupy a substantially vertically orientation. Apertures 74 are formed in the printhead structure whereever shield and control electrodes intersect such that they extend completely through the base member 62 and the shield and control electrode structures. The specific arrangement of shield and control electrode structures provides a DEP printer apparatus having multiplexed apertures, in that, each aperture is activated through the simultaneous biasing of one of the row electrode and a substantially vertically oriented control electrode.

During operation, the top and bottom shield electrodes 70 and 64 are biased to a negative 150 volts in their flow inhibiting state via DC supply voltages 80 and 82 while the shield electrodes 66 and 68 are biased to a negative 160 in their flow inhibiting state volts via a DC voltage supply 84. With the control electrodes $72_1$ through $72_n$ biased via DC voltage sources 86 through switches 87 to a negative voltage of 300 voltages, toner flow through the apertures is precluded. In order to effect toner flow through selected apertures 74, a positive voltage of 150 volts is sequentially applied, via DC biases 90 and switches 92, to shield electrodes 64 through 70 simultaneously with the application of a positive 40 volts via one of voltage sources 88 to selected control electrodes $72_1$ through $72_n$. This results in the shield electrodes 64 and 70 which are farthest from the donor roll surface being biased to 0 volts when they are on while the shield electrodes which are closer to the donor surface are biased to a minus 10 volts when they are on. This difference in shield voltage for the shield electrodes results in equal amounts of toner being delivered to all selected apertures regardless of spacing from the donor roll surface. It will be appreciated that the aforementioned voltages are exemplary only. In order to make the required quantity of toner available to the printhead apertures, the DC bias on the donor roll structure 24 is set at a positive voltage level in the order of 20 to 50 volts.

In lieu of applying different magnitudes of voltages to the various electrodes in accordance with their spatial orientation relative to the donor member surface, the duty cycle of equal magnitude voltages may be different depending on such relative spacing. In other words, for those apertures which are farther away from the donor roll surface the duration of the voltages applied to the electrodes corresponding to those holes would have a longer on time or toner passing time. While the shield electrodes are positioned opposite the donor roll structure the control electrodes may occupy that position. Also, delivery of equal quantities of toner regardless of donor roll surface to aperture spacing may be effected by varying the on time or the voltage magnitude of the on state of the control electrode voltage.

While a multiplexed printhead structure has been illustrated for insuring delivery of equal amounts of toner to each of the apertures it will be appreciated that equal amounts of toner delivery can be accomplished with a non-multiplexed printhead structure. For example, instead of providing the columnar control electrodes $72_2$ through $72_n$, individual control electrodes may be provided. In such an arrangement, the shield electrodes 64 and 70 would be biased to a constant 0 volts while the shield electrodes 66 and 68 would have a constant bias of −10 volts applied thereto.

What is claimed is:

1. Apparatus for forming images including a imaging particles delivery system, a printhead structure containing a plurality of apertures adapted to transport imaging particles therethrough which said imaging particles are supplied by said delivery system to a vicinity of said apertures and means for supporting image receiving substrates for movement past said printhead, said supporting means being adapted to attract said imaging particles transported from said delivery system through said printhead whereby said imaging particles are deposited in image configuration on said image receiving substrate, the improvement comprising:

said printhead structure having a plurality of control electrodes and a plurality of shield electrodes, said control and shield electrodes being secured to opposite sides of an apertured base member and having a plurality of apertures extending through said control and shield electrodes wherein each of said plurality of apertures in said control electrodes is aligned with a predetermined one of the apertures in said base member and one of the apertures in said shield electrodes to form imaging particles passing apertures in said printhead structure;

a donor member for delivering said imaging particles to said printhead structure, said donor member being disposed opposite one of said electrode structures; and means for selectively applying a voltage to each of said control electrodes simultaneously with application of a voltage to one of said shield electrodes whereby one of said imaging particles passing apertures in said printhead structure is conditioned to block or not block said imaging particle passage therethrough depending upon a magnitude of the voltage applied to said control electrodes.

2. Apparatus according to claim 1 wherein said donor member comprises an elongated, cylindrically shaped member such that said imaging particles passing apertures are not equally spaced from a surface of said cylindrically shaped donor member and wherein said means for selectively applying a voltage to said control electrodes for effecting delivery of a substantially equal quantity of imaging particles to said image receiving substrates through all of said plurality of apertures regardless of spacing said plurality of apertures from said donor member surface.

3. A method of forming images using imaging particles delivery system, a printhead structure containing a plurality of apertures adapted to transport imaging particles therethrough which said imaging particles is supplied by said delivery system to a vicinity of said apertures and means for supporting image receiving substrates for movement past, said printhead, said supporting means being adapted to attract said imaging particles transported from said delivery system through said printhead whereby said imaging particles are deposited in image configuration on said image receiving substrate, the improvement comprising: the step of providing a printhead structure having said control electrode structure and a shield electrode structure secured to opposite sides of a base member with said plurality of apertures extending through said control and shield electrodes and said base member;

providing a donor member for delivering imaging particles to said printhead structure, said donor member being disposed opposite one of said electrode structures; and selectively applying a voltage to each of said control electrodes simultaneously with the application of a voltage to one of said shield electrodes whereby one of said apertures in said printhead structure is conditioned to block or not block imaging particle passage therethrough depending upon a magnitude of the voltage applied to said control electrodes.

4. The method according to claim 1 wherein the step of providing a donor member comprises using an elongated, cylindrically shaped member such that said said apertures are not equally spaced from a surface of said cylindrically shaped donor member and wherein said means for selectively applying a voltage to said control electrodes for effecting delivery of a substantially equal quantity of imaging particles to said image receiving substrates through all of said plurality of apertures regardless of spacing of said plurality of apertures from said donor member surface.

* * * * *